Aug. 2, 1966    W. M. BARRET    3,264,555
MEAN DEVIATION METHOD OF RECONNAISSANCE EXPLORATION
OF THE EARTH WITH RADIO WAVES
Filed Dec. 31, 1964    3 Sheets-Sheet 1
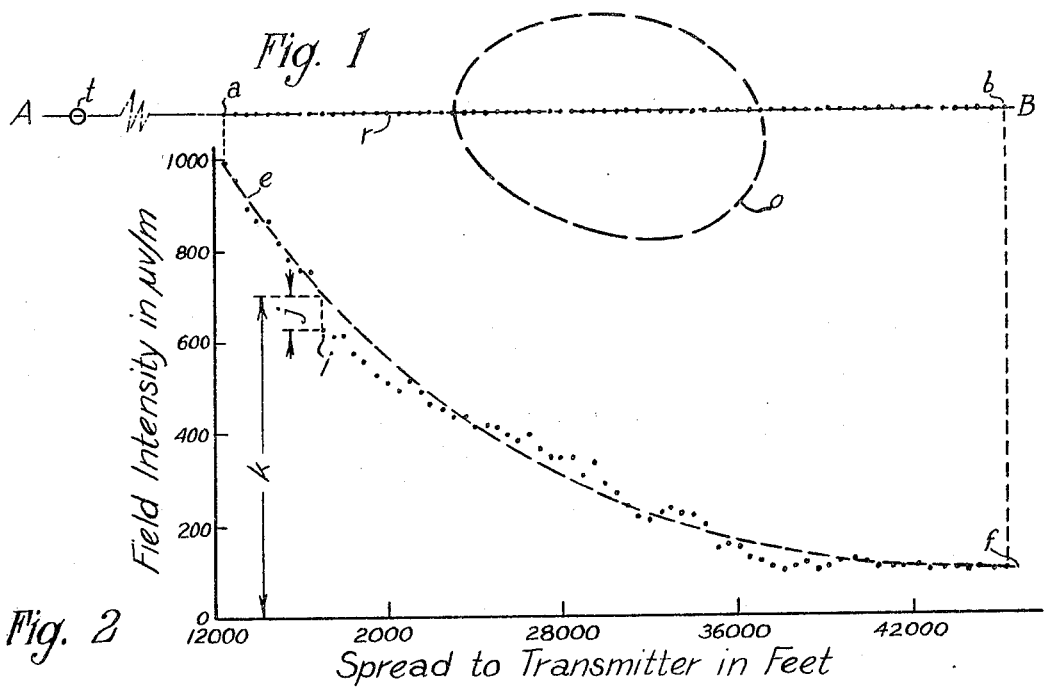
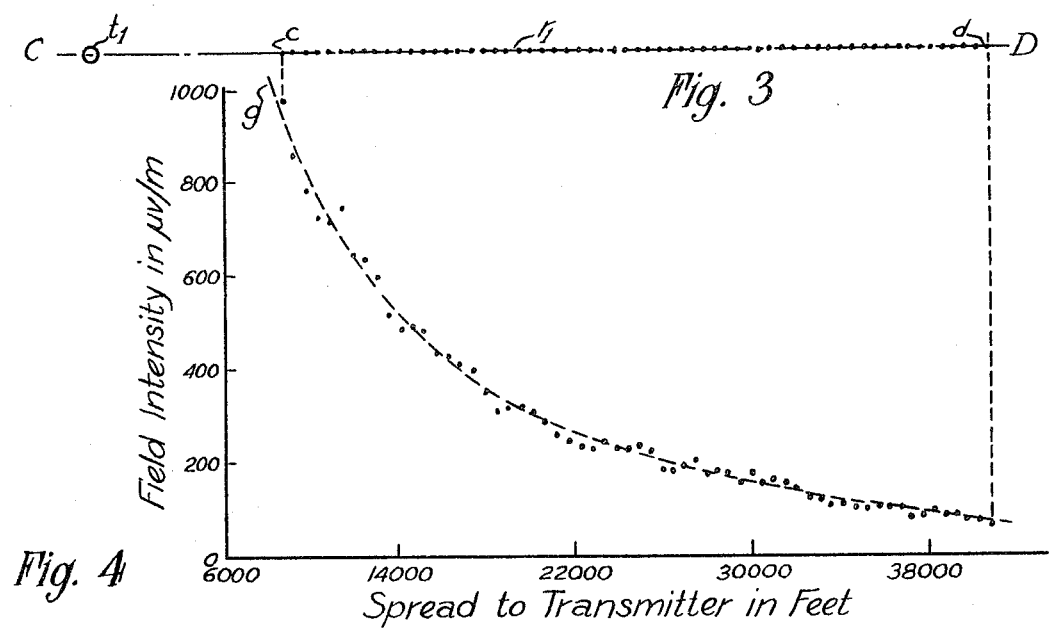
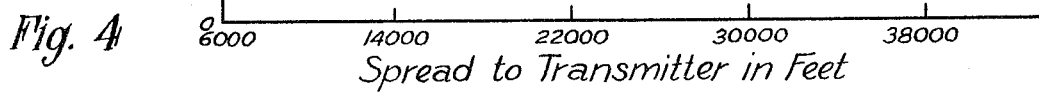
INVENTOR
William M. Barret
BY Newton, Hopkins,
Jones & Ormsby
ATTORNEYS United States Patent Office 3,264,555
Patented August 2, 1966

3,264,555
MEAN DEVIATION METHOD OF RECONNAISSANCE EXPLORATION OF THE EARTH WITH RADIO WAVES
William M. Barret, Shreveport, La., assignor to Engineering Research Corporation, Shreveport, La., a corporation of Louisiana
Filed Dec. 31, 1964, Ser. No. 425,672
4 Claims. (Cl. 324—6)

This application is a continuation-in-part of my co-pending application, Serial No. 799,272, filed March 13, 1959, now abandoned, for "Radio Method of Exploration," which is a continuation-in-part of application, Serial No. 328,786, filed December 30, 1952, for "Method of Radio Exploration."

This invention relates generally to the art of electrical prospecting, and more particularly to an improved method of exploring the earth with radio waves.

Applicant's U.S. Patent No. 2,172,688 discloses means for and a method of utilizing radio waves to locate subsurface geologic features, such as an oil deposit. In order to develop a diagnostic indication of an underlying oil deposit, one of the requirements of the method disclosed therein is that the transmitting means be located to one side of the oil deposit by a distance that is governed by the depth of the deposit. In searching for "wildcat" oil accumulations, where neither the presence, location nor depth of the oil is known, it is accordingly necessary to position the transmitting means at a large number of strategic locations, so as to be sure of occupying the proper position for developing a diagnostic indication of any oil accumulation that may be present. This procedure is so time consuming and costly that the use of the method is restricted largely to outlining oil fields already discovered by drilling but not yet defined in areal extent, and to investigating the oil-producing possibilities of structural prospects discovered by geological and/or other geophysical methods. Because of economic considerations, the method disclosed in the aforesaid patent is therefore adapted to detail surveying but not to reconnaissance surveying.

One of the objects of the present invention is to provide a radio method of exploring the earth which is adapted to rapid and relatively inexpensive reconnaissance investigations.

Another object is to furnish an effective method of radio exploration which does not require the accurate positioning of the transmitting means.

A further object is to provide a radio method which furnishes electrical indications that may be interpreted statistically in terms of subsurface conditions, thus making the method essentially independent of the technical skill and experience of the interpreter.

An additional object of the instant invention is to make available apparatus for conveniently and accurately measuring the deviation from normal of the radio observations made in carrying out the herein disclosed method.

The principle of operation and the application of the instant invention will be understood from the description which follows, together with the appended drawings, wherein:

FIG. 1 is a diagrammatic plan view of the field layout employed in practicing the preferred method of locating a subsurface geologic feature, such as an oil field.

FIG. 2 is a graph showing the field intensity observed along traverse a–b of FIG. 1.

FIG. 3 is a diagrammatic plan view of the field layout employed in practicing the preferred method of surveying an area devoid of a geologic feature.

FIG. 4 is a graph showing the field intensity observed along traverse c–d of FIG. 3.

Figure 5:
FIG. 5 is an opaque sheet having a transparent area which represents the anomalous area of the graph of FIG. 2.

In the preferred method of practicing the invention a traverse such as A–B is arranged to cross the area of interest, with the transmitter position $t$ and receiver stations $r$ being spaced along the traverse as indicated. A radio transmitter, such as the continuous wave unmodulated transmitter described in the aforesaid patent is next set up at an arbitrary position $t$ and its output preferably is fed into a radiating means of the character disclosed in applicant's U.S. Patent No. 2,585,907, which directs the waves along the receiver traverse a–b. Satisfactory results have been obtained when radiating 5 watts at any of the 5 geophysical frequencies now assigned by the Federal Communications Commission between 1,614 and 1,700 kilocycles per second, but it is to be understood that other power levels and other frequencies will be found suitable for practicing the invention. Using a field-intensity measuring device, such a the heterodyne receiver and loop antenna described in Patent No. 2,172,688, the field intensity of the waves is next determined at each stations from $a$ to $b$. The sam procedure is then followed for such additional traverse as may be required to explore the area under investiga tion.

The field intensities observed along the reeciver trav erses may next be displayed in the form of graphs, suc as that appearing in FIG. 2, where the field intensitie measured along receiver traverse a–b are plotted (eithe manually or with the aid of an X–Y recorder) as ord: nates and abscissas represent the spreads between the re spective receiver stations and the transmitter or other re erence point, or else they represent the locations of th various receiver stations along the traverse.

Curve, or profile, e–f is then constructed as the mea curve (as determined visually, or by electronic con puter, or otherwise) for displaying the average variatio with spread of the plotted field-intensity values. Th deviation of each of the plotted values from profile e– may next be determined as follows. The deviation c value $i$ is found by dividing the field-intensity interval by the interval $k$. The same procedure is followed fc each of the plotted values, and the individual deviatior are added, without regard to sign, and divided by th total number of plotted values appearing in FIG. 2. Th quotient thus found is the mean deviation of the plotte values from profile e–f. By a similar process, the mea deviation may be found for the field-intensity values ol served along such other traverses as may be needed t explore the area in question, and the mean deviatior relating to the several traverses may then be average to give the mean deviation for the area explored.

According to the teachings of the present inventio: the magnitude of the mean deviation relating to a pa ticular area provides a criterion for determining whethe or not the area embraces a subsurface geologic featur for experience has shown that the mean deviation for a area enclosing a geologic feature ordinarily will be si nificantly larger than the mean deviation for an area th is barren of such a feature. Inasmuch as the mean de ation varies somewhat from one locality to another, th deviation is best evaluated in terms of a geologic feature by comparing the mean deviation for the area in question with the mean deviation for a nearby area that is known from drilling or otherwise to be devoid of such a feature. The method of evaluation will be understood from what follows.

Suppose, for example, that traverse A–B (FIG. 1) passed over a geologic feature, such as indicated diagrammatically by the outline $o$, and that the mean deviation shown by the data of FIG. 2 is representative of the mean deviation for the area enclosing the geologic feature. Suppose, also, that traverse C–D (FIG. 3), comprising the transmitter position $t_1$ and receiver stations $r_1$, crossed a nearby area that is barren of a geologic feature; that the plotted field-intensity values of FIG. 4 were observed along receiver traverse $c$–$d$, and that the mean deviation of these values from profile $g$–$h$ is representative of the mean deviation for the area surveyed.

Actually, traverse A–B crossed over the North Tepetate oil field of Acadia Parish, Louisiana, and traverse C–D was located in a nearby area that is known from drilling to be devoid of a geologic feature. It can be shown that the mean deviation for the data of FIG. 2 is 7.67 percent, and that the mean deviation for the data of FIG. 4 is 5.15 percent. The mean deviation over the oil field is accordingly 49 percent larger than the mean deviation for the barren area.

Despite the fact that the method set forth in Patent No. 2,172,688, as well as the methods disclosed in the prior art, will not establish the presence of the oil field from their prescribed treatments of data comparable to that shown in FIGS. 2 and 4, it is seen that the herein disclosed method does provide an effective statistical technique of indicating the presence of the oil field. Moreover, this technique is founded on mechanical steps which do not require experience or technical skill on the part of the interpreter.

Surveys conducted in accordance with the method disclosed herein have shown that, when a representative number of profiles are obtained over an oil field, and a representative number of profiles are secured in a comparable area that is barren of a geologic feature, then the average deviation is significantly larger for the data observed over the oil field. As a result of some 20 field surveys carried out over oil fields and a like number of comparison surveys in barren areas in the same general localities, it has been learned that the mean deviation over the oil fields is of the order of 50 percent larger than the mean deviation for the barren areas.

Other surveys conducted over different types of geologic features, such as metallic mineral deposits, natural gas deposits, nonmetallic mineral deposits other than petroleum and natural gas, salt domes, igneous masses and fault zones, have demonstrated that the presence of these geologic features may also be indicated by the significant deviation increase they frequently cause. Ordinarily, the largest deviations are observed over oil accumulations and over metallic mineral deposits.

Unlike the method described in Patent No. 2,172,688, the transmitting means does not have to be accurately positioned to one side of the geologic feature under investigation. It preferably should be far enough removed from the feature to permit the propagated radio energy to strike the upper surface of the feature, but near enough to keep the receiver readings well above the ambient noise level. Satisfactory results have been obtained when the transmitting means was located to one side of the geologic feature by a spread of from one to five or more times the depth of the feature. In practicing the preferred method of the instant invention, it is not even necessary to know the spread between the transmitting means and the geologic feature surveyed, or the spread between the transmitting means and any of the receiver stations. Alternatively, the transmitting means may be located over, rather than to one side of, the mineral deposit or other geologic body under investigation, and the receiver traverse may overlie but a portion of the deposit or body. These desirable features further distinguish the invention from the methods disclosed in the prior art.

It is evident from what has gone before that the method disclosed herein is well adapted to reconnaissance surveying, inasmuch as the method may be performed effectively and rapidly without any prior geological or geophysical knowledge of the area explored. The presence of a geologic feature is indicated when the mean deviation observed along a particular traverse or traverses substantially exceeds the mean deviation observed along an adjacent traverse or traverses. After thus determining that a geologic feature underlies a particular traverse or traverses, the areal configuration of the feature may be delineated by reference to the most anomalous segment of each profile displaying the higher deviation.

The preceding description of the preferred method contemplates the propagation from a stationary transmitting means of continuous and unmodulated vertically polarized sinusoidal radio waves of substantially constant amplitude and frequency, and the measurement of the field intensity of the waves with a portable receiving means which occupies a series of stations spaced apart from the transmitting means by successively varying spreads.

It will be obvious to one versed in the art that either the transmitting means or the receiving means may constitute the stationary or portable unit, or that both units may be moved simultaneously, or that either or both units may be designed for mobile operation; that receiving means may be provided for the continuous measurement of the field intensity along the receiver traverse, rather than for the preferred series of measurements at spaced stations; that interrupted waves may be used instead of continuous waves; that various type of modulated waves may be employed to replace the preferred unmodulated waves; that different kinds of polarizations and wave forms may be substituted for the vertically polarized sinusoidal waves specified, and that currents or pulses may be used in place of the electromagnetic waves considered herein. Moreover, it will be recognized that other field parameters or characters will vary simultaneously with the field intensity, and that accordingly the operation of the invention may be predicated on the measurement of any selected parameter or characteristic of the electromagnetic field associated with the propagated energy, such as the area of the field ellipse, or its spatial orientation, or the magnitude of the major or minor axis of the ellipse, or on the measurement of any selected component of the resultant field vector, or on any quantity related thereto, such as the tilt of the wave front. The operation of the invention may also be based on phase measurements, which may be made in accordance with the method disclosed in applicant's application Serial No. 106,006, filed July 21, 1949, now Patent No. 2,901,688. In the claims appended hereto, the term "characteristic" shall therefore be taken to include any of the field variables here specified, as well as any other quantity functionally related to these field variables.

In the preferred method, the transmitting means propagates waves of substantially constant frequency and amplitude, but here again it is to be understood that departures are permissible, for frequency variations may be followed by a tunable receiving means, and amplitude changes may be compensated for in various ways, for example, by the method disclosed in applicant's U.S. Patent No. 2,573,682. Furthermore, the preferred method of determining the deviation of the measured quantity is to be regarded as illustrative rather than restrictive, for it is evident that the deviation may be determined in other ways, for instance, by passing a curve through each of the observed values of FIG. 2 and determining the mean deviation by finding the area enclosed by this curve and a reference curve, such as the profile $e$–$f$, and then dividing the "anomalous" area by the "normal" area under the reference curve. The comparison of areas here referred to may be made conveniently by the means described hereinbelow.

With reference to FIG. 5, the anomalous area of FIG. 2 is represented on the sheet 1 by the transparent area 2, which is surrounded by the opaque area 3. Similarly in FIG. 6, the normal area of FIG. 2 is represented on the sheet 4 by the transparent area 5, which is bounded on its upper side by the opaque area 6.

Figure 6:
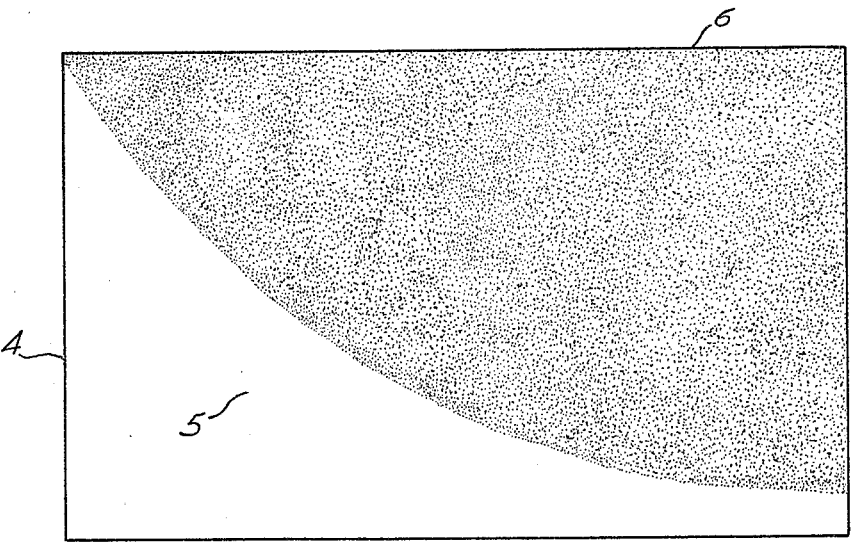
FIG. 6 is an opaque sheet having a transparent area which represents the normal area of the graph of FIG. 2.

When the anomalous sheet 1 and the normal sheet 4 are placed between like light sources 7 and 8 (FIG. 7) and like photoelectric cells 9 and 10, the output voltage of the cells 9 will be proportional to the anomalous area 2 of FIG. 5, and the output voltage of the cells 10 will be proportional to the normal area 5 of FIG. 6.

If the output of cells 9 and 10 be fed into like direct current, logarithmic amplifiers 11 and 12, respectively, then the output voltage of each amplifier will be proportional to the logarithm of its input voltage.

By applying the outputs of the amplifiers 11 and 12 to the resistive network that includes the like resistors 13 and 14, the voltage drop across resistor 15 will be proportional to the difference between the logarithmic outputs of the amplifiers 11 and 12, and said voltage drop may be indicated by the voltmeter 16.

If the voltmeter 16 be provided with a logarithmic scale, then its indication will be proportional to the antilogarithm of the difference between the logarithmic outputs of the amplifiers 11 and 12. The voltmeter indication will therefore be proportional to the ratio of the amplifier inputs.

Figure 7:
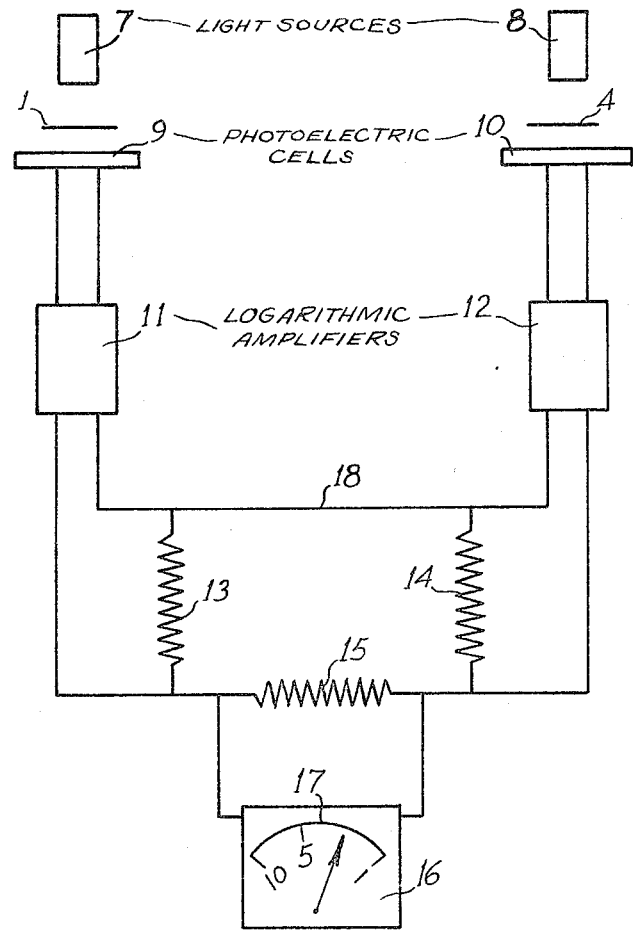
FIG. 7 is a circuit diagram of the preferred form of apparatus for comparing areas, such as the transparent areas of FIGS. 5 and 6, and thereby measuring the deviation from normal of recorded data, such as the plotted values of FIG. 2.

Inasmuch as the transparent area 5 of FIG. 6 will be larger than the transparent area 2 of FIG. 5, it follows that the input to amplifier 12 will be larger than the input to amplifier 11, so that the indications of voltmeter 16 of FIG. 7 will be proportional to the quotient of the transparent area 5 divided by the transparent area 2.

As the reciprocal of this quotient will represent the ratio of transparent area 2 to the transparent area 5, the voltmeter 16 will indicate directly the mean percentage deviation from normal of the recorded values of FIG. 2, or other comparable data under examination, when its scale is properly calibrated in accordance with the reciprocals of its logarithmic indications, as indicated diagrammatically by the scale 17 in FIG. 7.

The preferred apparatus hereinabove disclosed for determining the mean deviation related to profiles, or for comparing areas of other forms, is subject to various modifications. For example, instead of the preferred determination of the mean deviation of the observed values along the entire profile, the deviation at any point along the profile may be found by passing the light beams from the light sources 7 and 8 through narrow vertical slits, so as to illuminate only the desired and corresponding parts of sheet 1 (FIG. 5) and sheet 4 (FIG. 6). The reading of voltmeter 16 (FIG. 7) would then indicate the percentage deviation at the desired point of the profile.

A further modification of the preferred apparatus of FIG. 7 would be to replace the linear-response photoelectric cells 9 and 10 of FIG. 7 with silicon solar cells which provide output voltages that vary logarithmically with the illumination level, and with this arrangement the output of the solar cells would be fed into linear amplifiers instead of the logarithmic amplifiers 11 and 12.

Moreover, the light beams from light sources 7 and 8 may be modulated in various ways, so that alternating current amplifiers and an alternating current meter may be substituted for the direct current amplifiers 11 and 12 and the direct current meter 16.

Other modifications of the preferred apparatus are apparent, such as the use of an indicating current meter in line 18 of FIG. 7 in place of, or in addition to, the voltmeter 16, or the use of a recording voltmeter or current meter, the chart of which would be moved in synchronism with the progressive and like movement of sheet 1 and sheet 4 past the light slit referred to above so as to furnish a continuous record of the deviation along the entire length of the profile under investigation.

Although additional modifications of the apparatus will occur to those versed in the art, it is to be understood that the preferred apparatus hereinabove disclosed provides a convenient means for determining the mean deviation from normal of the radio observations used in carrying out the method of the instant invention, and i performs its function without recourse to any mental steps. It is clear that the preferred apparatus, or obvious modifications thereof, is suitable for comparing various other forms of regular and irregular areas, and accordingly its use is not restricted to the profile data considered herein.

It is to be understood therefore that various modifications may be made in the method hereinbefore disclosed and in the apparatus referred to for carrying out the method, without departing from the spirit of the invention as defined in the following claims.

I claim:

1. A radio method of locating subsurface geologic features comprising the steps of propagating electromagnetic waves along a traverse so that some of said waves are refracted into the earth, measuring a characteristic of said waves at a plurality of locations along said traverse recording the measured values of said characteristic against the location along said traverse at which said characteristic was measured to obtain a plot of the recorded measurement, constructing the mean curve through the plotted values, determining the deviation of said measured characteristic at each location from said mean curve, determining the average deviation of said measured characteristic from the mean curve from measurement made in an area known to be void of a geologic feature and determining which of said deviations are significantly different from said average deviations.

2. The method according to claim 1 in which said characteristic that is measured is the intensity of the waves, wherein the amplitude and frequency of said waves are maintained substantially constant.

3. The method as defined in claim 1, wherein the source of said waves is located to one side of the area under investigation for the presence of a geologic feature.

4. The method as defined in claim 1, wherein the source of said waves is located over the area under investigation for the presence of a geologic feature.

References Cited by the Examiner

UNITED STATES PATENTS

| | | | |
|---|---|---|---|
| 2,172,688 | 9/1939 | Barret | 324—( |
| 2,410,550 | 11/1946 | Pavda | 88—1. |
| 2,426,918 | 9/1947 | Barret | 324—( |
| 2,573,682 | 11/1951 | Barret | 324—( |
| 2,578,882 | 12/1951 | Eash | 88—1. |
| 2,679,639 | 5/1954 | Locher. | |

WALTER L. CARLSON, *Primary Examiner.*

G. R. STRECKER, *Assistant Examiner.*